United States Patent [19]

Hopkins

[11] 4,444,379
[45] Apr. 24, 1984

[54] TRIGGER RELEASE CLAMP
[75] Inventor: Thomas H. Hopkins, San Jose, Calif.
[73] Assignee: FMC Corporation, Chicago, Ill.
[21] Appl. No.: 338,795
[22] Filed: Jan. 11, 1982
[51] Int. Cl.³ .............................................. B25B 1/00
[52] U.S. Cl. ...................................... 269/87; 269/93; 269/157; 269/228; 228/49 R; 83/384
[58] Field of Search ............. 228/49 R; 83/384, 383; 219/158, 161; 269/55, 89, 91, 93, 100, 101, 157, 201, 228, 233, 87, 329, 24

[56] References Cited
U.S. PATENT DOCUMENTS

| | | |
|---|---|---|
| 1,759,036 | 5/1930 | Brantingham . |
| 1,938,771 | 12/1933 | Archea .................................. 90/59 |
| 2,567,436 | 9/1951 | Lampe .................................. 74/106 |
| 2,579,675 | 12/1951 | Kaplan et al. ..................... 83/383 X |
| 2,888,052 | 5/1959 | Reason ................................ 144/290 |
| 3,099,182 | 7/1963 | Alverson ............................... 83/383 |
| 3,237,463 | 3/1966 | McPherson ........................... 74/106 |
| 3,362,301 | 1/1968 | Kohlitz ................................ 269/24 X |
| 3,393,594 | 7/1968 | Wallis ............................... 83/384 X |
| 3,782,712 | 1/1974 | Blatt .................................... 269/228 |
| 3,912,251 | 10/1975 | Fraser et al. ....................... 269/228 |
| 3,924,844 | 12/1975 | Bachtel, Jr. ........................... 269/94 |
| 4,036,091 | 7/1977 | Borzym ............................ 83/383 X |
| 4,141,543 | 2/1979 | Kato ................................... 269/228 |
| 4,331,326 | 5/1982 | Strouss ................................. 269/93 |

Primary Examiner—Robert C. Watson
Assistant Examiner—Steven P. Schad
Attorney, Agent, or Firm—H. M. Stanley; R. B. Megley

[57] ABSTRACT

A welding fixture mounts a self-clearing workpiece clamp having an arm that is pivotally mounted on the fixture and carries over-center toggle linkage for a clamp jaw. A trigger connected to the linkage is engaged by a moving welding head for releasing the clamp jaw, whereupon a spring swings the clamp arm clear of the welding head.

12 Claims, 13 Drawing Figures

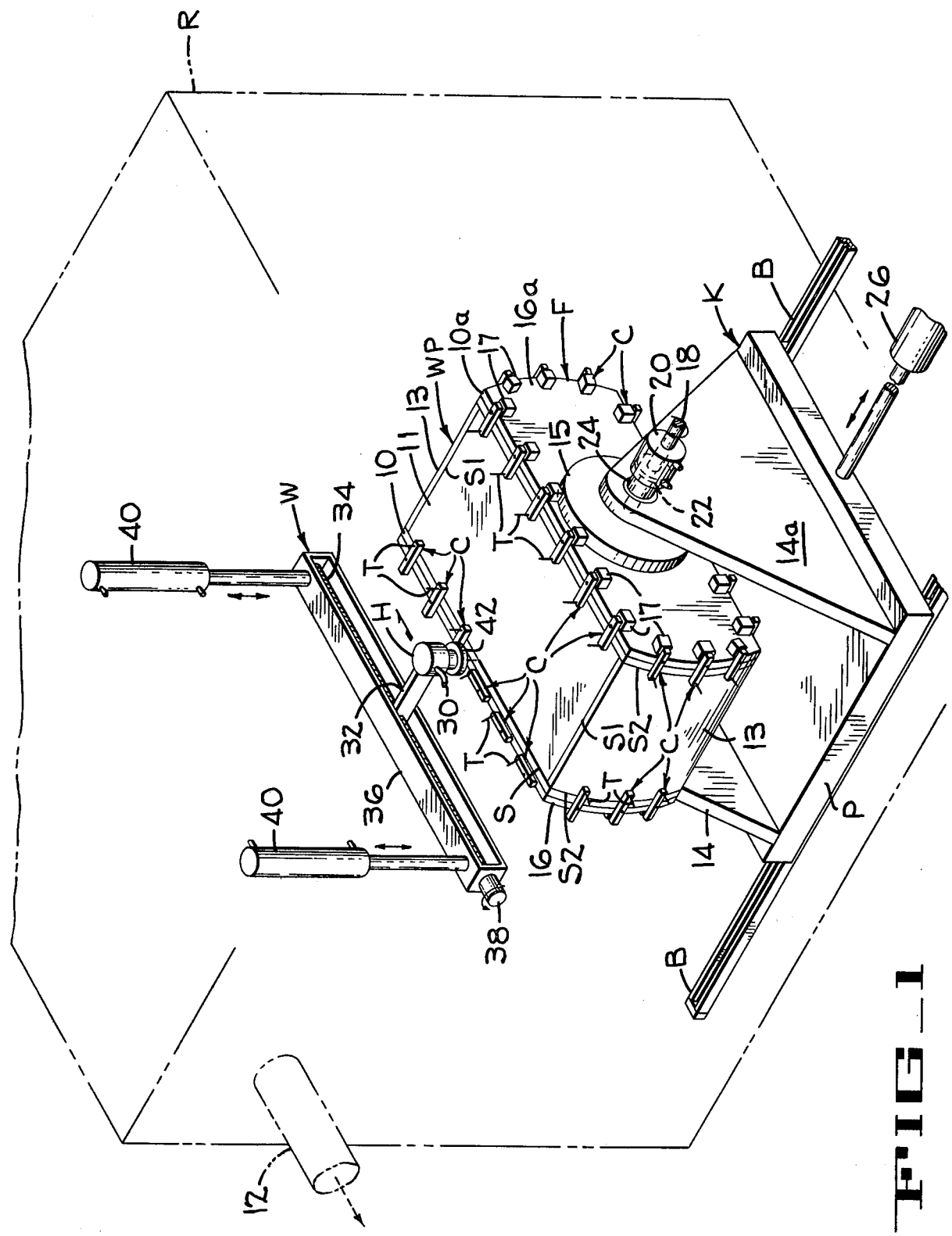
FIG_1

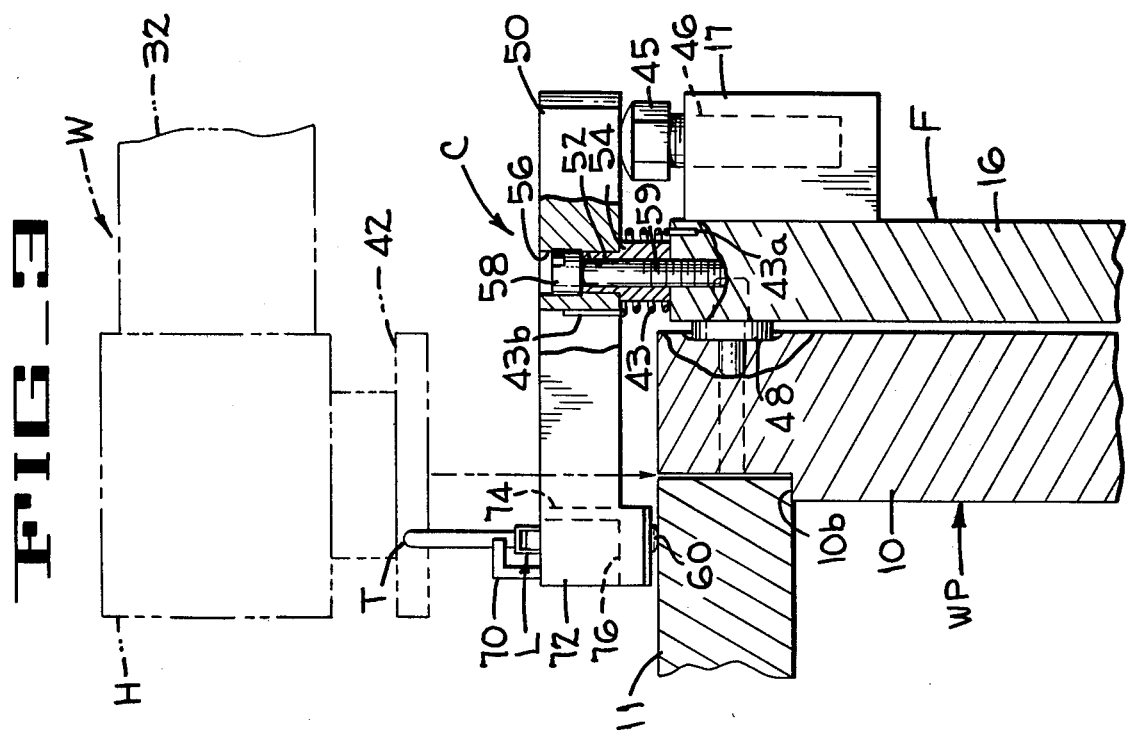
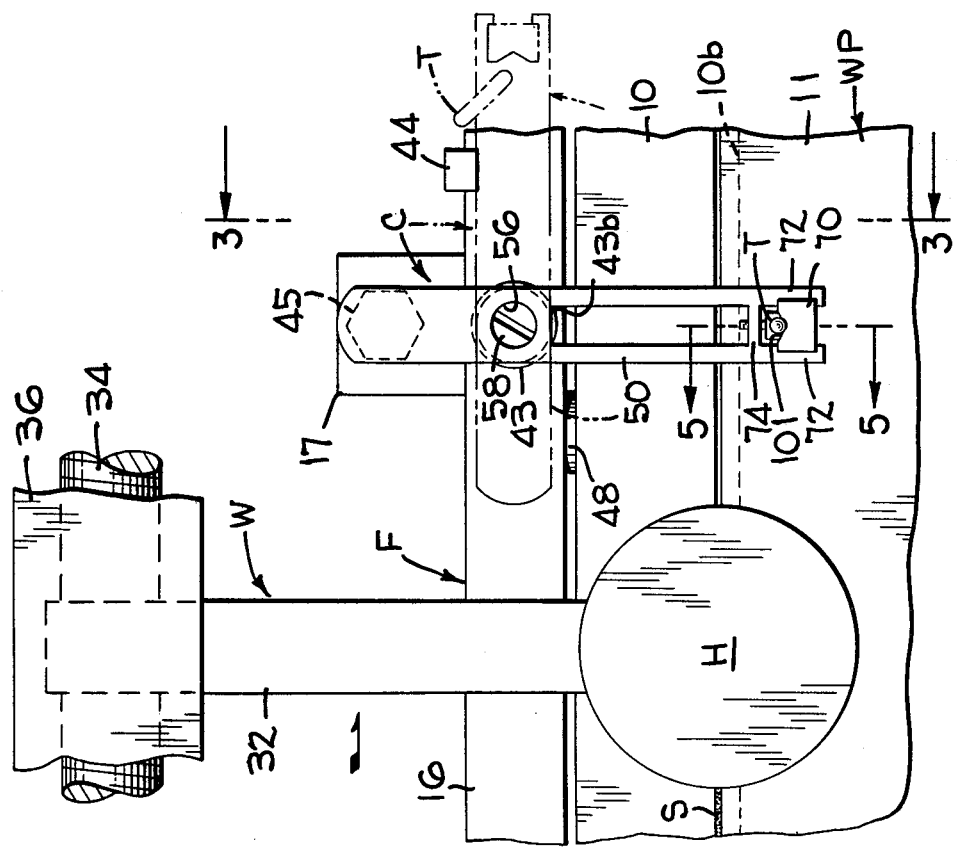

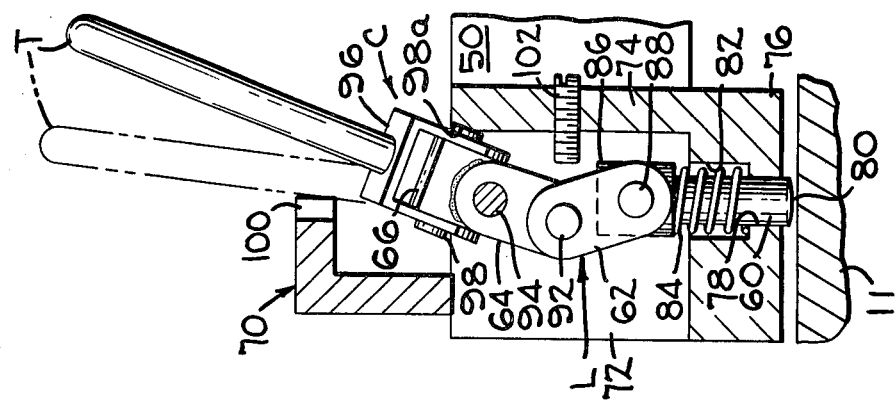
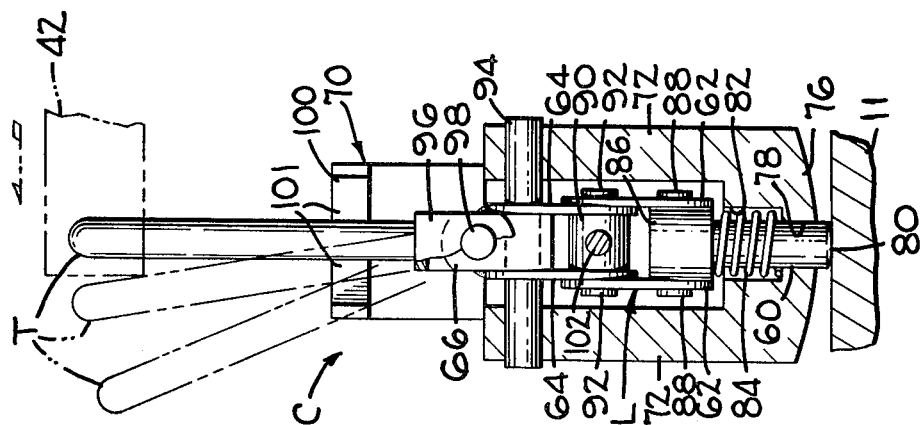
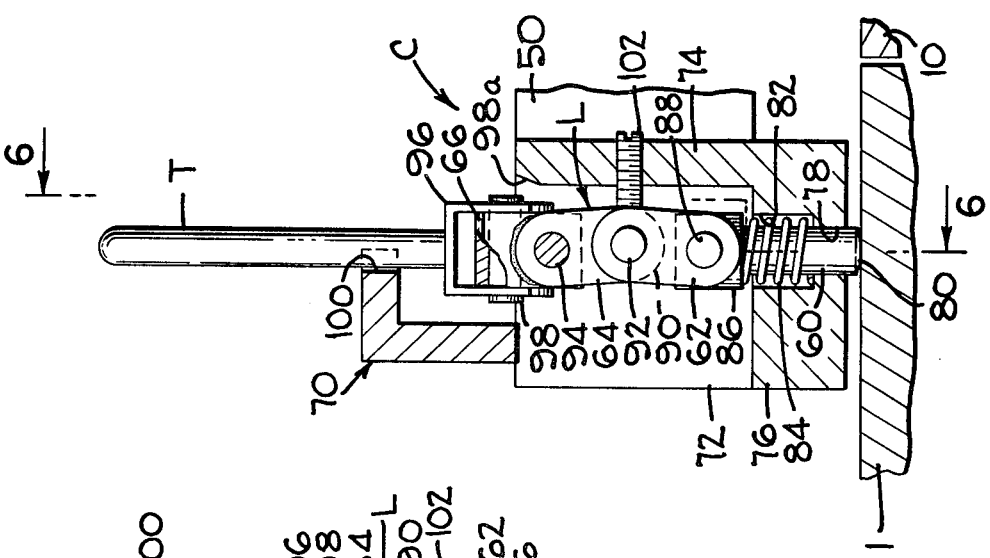
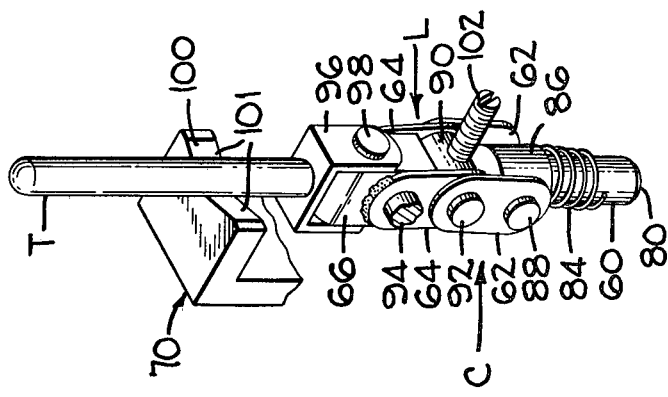

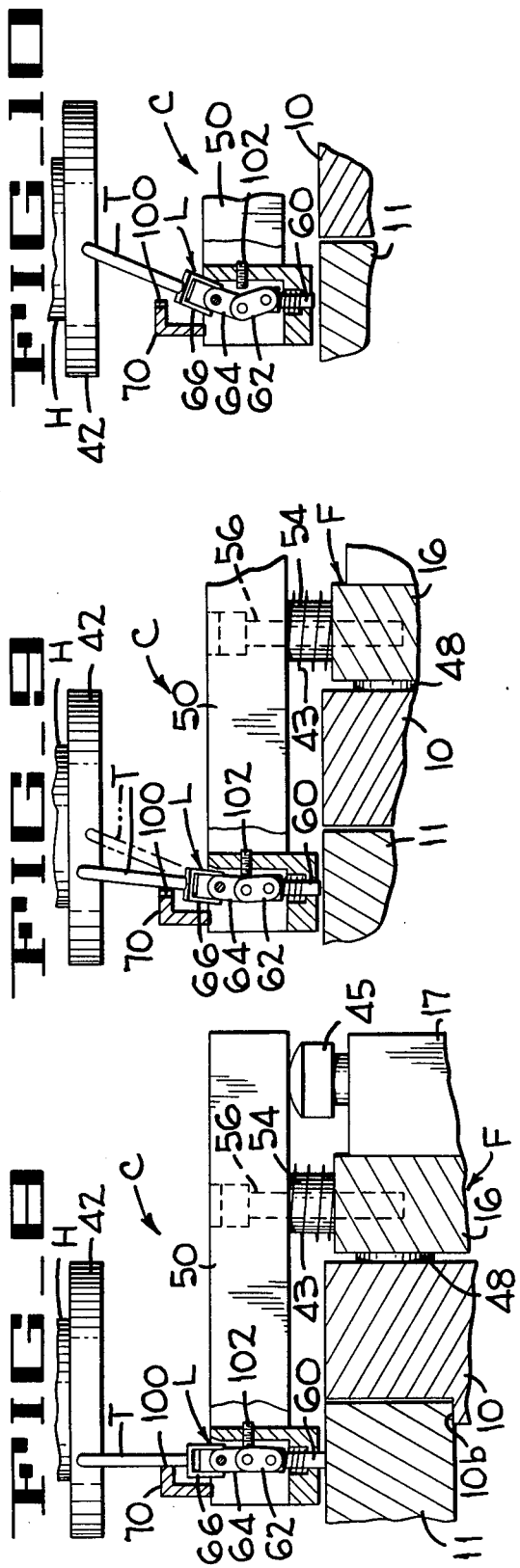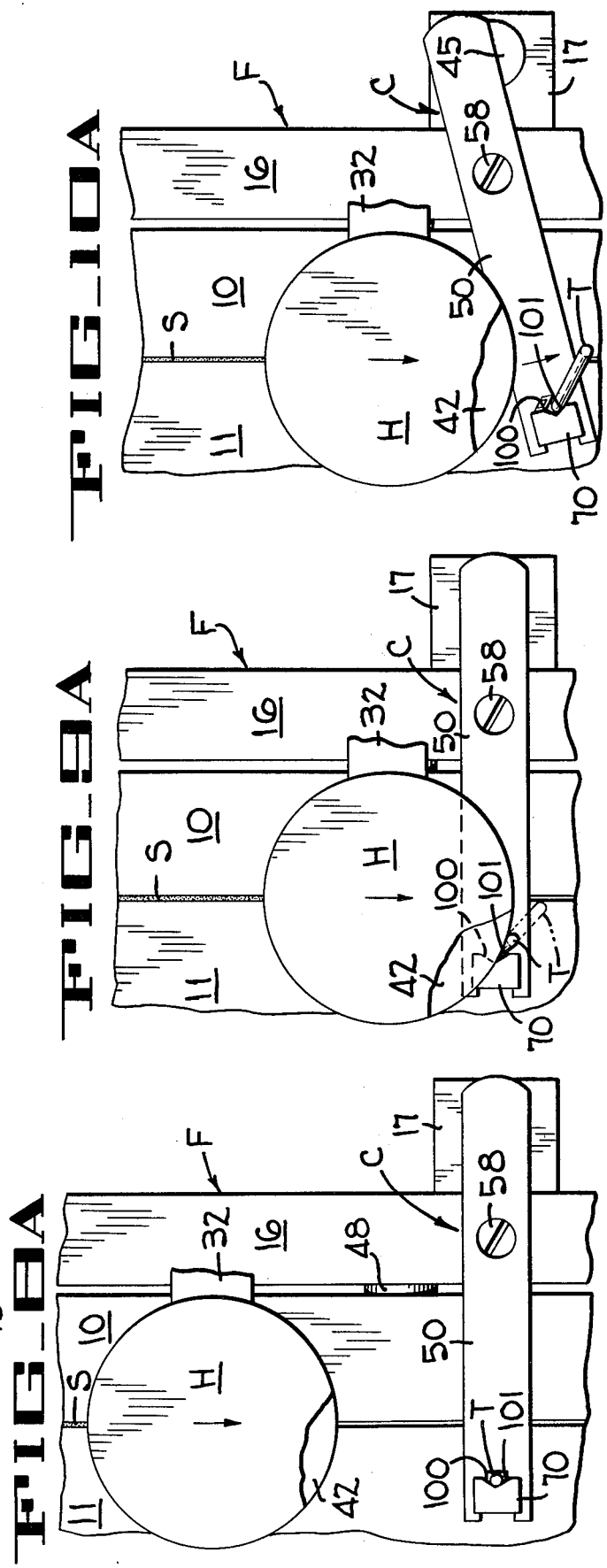

TRIGGER RELEASE CLAMP

BACKGROUND OF THE INVENTION

1. Field of the Invention

This invention relates to a work fixture having a workpiece clamp, and more particularly to a fixture such as a welding fixture wherein one or more workpiece clamps automatically release and move clear of a tool, such as a welding head, when the clamp is triggered by approach of the tool or welding head.

2. Description of the Prior Art

Brantingham U.S. Pat. No. 1,795,036, May 20, 1930 discloses a welding fixture wherein the top wall of a sheet metal refrigerator liner is clamped against a horizontal support base template by a pivoted outside clamping template plate. The outside template plate pivots about a horizontal axis and the template is operated by a manual handle that is raised or lowered to actuate a toggle linkage assembly for the clamping template plate.

Archea U.S. Pat. No. 1,938,771, Dec. 12, 1933 discloses a milling machine formed with fluid pressure operated sliding clamps projecting up through a fixture plate that supports the workpiece. Clamp release valve levers are operated by dogs mounted on the reciprocating milling machine table.

Lampe U.S. Pat. No. 2,567,436, Sept. 11, 1961 discloses a toggle clamp wherein clamping is effected by reciprocating a rod through an over-center linkage operated by a manual handle.

Reason U.S. Pat. No. 2,888,052, May 26, 1959 discloses a bench mounted manual clamp screw supported on a manually swingable clamping arm that overhangs the workpiece.

Bachtel, Jr. U.S. Pat. No. 3,924,844, Dec. 9, 1975 discloses a toggle clamp lock wherein a pivoted swinging clamp arm is retracted by a manually operated pivoted handle with the handle and clamp arms swinging in the same plane.

McPherson U.S. Pat. No. 3,237,463, Mar. 1, 1966 discloses a double acting plunger clamp wherein a sliding clamping plunger is reciprocated by a bell crank manual handle and a bridge link.

Blatt U.S. Pat. No. 3,782,712, Jan. 1, 1974 discloses a toggle clamp resembling that of Brantingham except that the handle can be manually operated to pivot the clamp arm extirely clear of the fixture. The handle and clamp arm pivot axes are parallel.

Fraser et al. U.S. Pat. No. 3,912,251, Oct. 14, 1975 discloses a toggle clamp that is basically the same as that of McPherson U.S. Pat. No. 3,237,463.

Kato U.S. Pat. No. 4,141,543 discloses (FIG. 7) a pivoted clamp arm and a pivoted manual actuated handle where the pivot axes are parallel. The device is basically like that of Blatt U.S. Pat. No. 3,782,712.

SUMMARY OF THE INVENTION

The present invention relates to a workpiece clamping fixture which supports and clamps a workpiece during a fabrication operation by a tool. In the embodiment disclosed, the workpiece is mounted in a welding fixture and workpiece parts to be welded together are releasably clamped together by a clamping assembly during relative motion of the welding head and the fixture.

The clamping assembly includes a clamping jaw, jaw actuated mechanism and a clamp actuating trigger connected to the mechanism. The trigger projects into the path of the tool or welding head but is displaceable when engaged by the welding head. The clamping assembly is mounted on an arm that overhangs the workpiece but which can swing clear of the tool or welding head when the latter engages the trigger for releasing the clamping jaw.

In the preferred embodiment of the invention, the jaw actuating mechanism is an over-center toggle linkage and the trigger is pivotally connected to the linkage. When the linkage is slightly over-center in one direction, the clamping jaw clamps the workpiece. When a tool, such as a welding head, engages a trigger, the latter is pivoted in a manner which forces the toggle linkage past center in the opposite direction, thereby releasing the clamp jaw. Upon release of the clamp jaw, the arm that mounts the clamping assembly is free to swing on its mounting fixture clear of the advancing tool or welding head so that the latter can perform this operation on the workpiece without interference from the clamp assembly.

Preferably, a spring is connected between the clamp assembly mounting fixture and the clamp assembly which swings the clamp assembly clear of the advancing tool or welding head when the tool actuates the trigger to release the clamp, as mentioned above.

One feature of the present invention resides in the operation of an over-center toggle linkage that closes and releases the clamping jaw. When the toggle linkage is positioned in one direction to a slightly over-center position (determined by a stop) the clamping jaw is closed to its workpiece clamping position. When the linkage is shifted in the opposite direction to a substantially over-center position, the clamping jaw is released. Preferably, a spring urges the toggle linkage toward whichever over-center position it has assumed during its two conditions of operation.

In the preferred embodiment of the invention, the clamp can be released by actuation of the trigger element by the tool or welding head element, during relative motion of those elements in either direction along the work path or the welding seam. In the preferred embodiment of the invention, this is made possible by causing the trigger to swing from its normal, clamp-engaged position along the concave surface of a trigger shifting cam, when the trigger is engaged by the tool or welding head. Motion of the trigger in a plane along the cam surface is converted into motion normal to the cam surface and the latter motion actuates the toggle linkage that releases the clamp.

The trigger is pivotally connected to the toggle linkage for pivotal motion in one plane only, namely, in a plane which is normal to that plane of motion of the trigger which actuates the toggle linkage for releasing the clamp.

The manner in which the aforesaid features and advantages of the present invention can be attained will be apparent from the following detailed description of a preferred embodiment of the invention.

DETAILED DESCRIPTION OF THE DRAWINGS

FIG. 1 is a diagrammatic perspective of a fixture, workpiece and welding head setup that embodies the clamps of the present invention.

FIG. 2 is a fragmentary plan view of a welding clamp and workpiece assembly of the present invention.

FIG. 3 is a section taken on line 3—3 of FIG. 2.

FIG. 4 is a fragmentary perspective of the clamping toggle linkage and the trigger.

FIG. 5 is a fragmentary section taken on line 5—5 of FIG. 2.

FIG. 6 is a section taken on line 6—6 of FIG. 5.

FIG. 7 is a view similar to that of FIG. 5 showing the clamp in its workpiece releasing position.

FIG. 8 is a diagrammatic view resembling that of FIG. 5 showing the clamp engaging the workpiece.

FIG. 8A is a diagrammatic plan view corresponding to that of FIG. 8, showing the welding head at the clamp trigger.

FIG. 9 is a diagrammatic view like that of FIG. 8 showing the clamp just after it has been released by the welding head.

FIG. 9A is a plan view of the conditions shown in FIG. 9.

FIG. 10 is a view resembling FIG. 9 except that the clamp is in the process of swinging clear of the workpiece.

FIG. 10A is a plan view of the conditions shown in FIG. 10.

DETAILED DESCRIPTION OF A PREFERRED EMBODIMENT

General Arrangement

An exemplary setup for employing the clamping fixture of the present invention is illustrated diagrammatically in FIG. 1. In this Figure, the clamps are employed in connection with retaining workpieces in their correct relative positions as they are being seam welded.

In FIG. 1, the workpiece WP, the parts of which are being welded together, is in the shape of a tank fabricated from aluminum plates. The clamps of the present invention are illustrated generally at C. The workpiece is supported on a carriage K which mounts a fixture F that removably supports the workpiece WP on the carriage. In the embodiment of the invention shown a seam S is being welded by a welder illustrated generally at W having a welding head H. The welder illustrated is of the electron beam type manufactured by the Sciaky Bros., Inc., Chicago, Ill. The electron beam welder must operate in a vacuum and hence the entire structure just described is mounted in an evacuated chamber or room R with air and other gases withdrawn from the room by means of a gas evacuation line 12 connected to a vacuum pump system (not shown).

In the embodiment of the invention illustrated in FIG. 1, controlled relative motion between the workpiece and the welding head can be provided by either moving the workpiece relative to a fixed welding head, the welding head relative to a fixed workpiece or both elements can move simultaneously. The nature of the various structures for providing for the aforesaid relative motions are not critical to the present invention and those illustrated are merely provided by way of example.

The carriage K can be moved linearly along floor mounted tracks B that extend inside of the evacuated room R. The carriage K has a table P that is slidable along those tracks. Uprights 14 and 14a projecting from the table P mount the workpiece supporting fixture F. The fixture includes a clamp disc 15 connected to a clamp plate 16a on one side of the workpiece and a companion clamp plate 16 is disposed on the opposite side of the workpiece, plate 16 being supported by the upright 14. The clamps C of the present invention are pivotally mounted on the fixture plates 16 and 16a and each clamp is backed up by a backup lock 17, in a manner to be described in detail presently.

The fixture plate 16a and its mounting disc 15 are both rotatably and slidably mounted in the upright 14. They are slidably mounted in order to provide the clamping action against the workpiece and they are rotatably mounted in order to provide relative motion of the workpiece relative to the welding head H in cases where the welding head is horizontally stationary and the workpiece is rotated relative to the welding head. The opposed fixture plate 16 is rotatably mounted on upright 14.

In order to provide the sliding (clamping) and rotary motions of the disc 15 and the fixture clamp plate 16a, the disc 15 is mounted on an axial shaft 18 that slides through a double acting fluid cylinder 20. The fluid cylinder encloses a piston 22 secured to the shaft 18 and the cylinder is mounted on the upright 14a by a sleeve 24. In case it is desired to rotate the fixture F and the workpiece WP relative to the welding head H, a rotating motor or the like is connected to a projection on the shaft 18, the motor not appearing in FIG. 1 because the details of this aspect of the fixture construction are not critical to the present invention.

The Welder

Details of the construction of the welder W are not critical to the present invention but an electron beam welder employed in conjunction with the fixture F previously described will now be explained in principle. The electron beam welder head H has a power supply line 30 connected to a high voltage DC power source. A beam of electrons is emitted from the cathode within the welding head and the beam forms a deep, welded seam S as the head moves relative to the work. The head can be advanced in either direction along a linear welding path by means of a bracket 32 mounting the head, which bracket contains a nut that is received in a rotatable lead screw 34 that is rotatably mounted in a housing 36. The lead screw 34 can be rotated in either direction by a remotely controlled motor 38.

The welding head H can be raised and lowered relative to the workpiece by means of remotely controlled fluid cylinder assemblies 40 connected to the screw housing 36. Thus the head can be vertically positioned relative to the desired welding seam S on the workpiece and it can be moved along that seam by the screw 34. The workpiece can be moved relative to the welding head by advance or retraction of the carriage K that mounts the fixture F for the workpiece, and by rotation of the fixture F by shaft 18.

General Clamp Arrangement

Still referring to FIG. 1, the clamps C are pivotally mounted on their associated fixture plates 16 or 16a by means of workpiece overhanging arms, to be described presently. Each clamp has an upstanding trigger T which is engaged by a camming flange 42 on a lower portion of the welding head H. As the camming flange 42 engages a trigger T of a clamp C which is in its clamping position relative to the work piece, the clamp is released and the arm upon which it mounts swings clear of the welding head so that the welding seam S can be extended along the length of the workpiece previously covered by the clamp. In FIG. 1, three of the clamps C have swung clear along a welded seam S and three more clamps C are still overhanging the workpiece along the unwelded portion of the seam and clamping the parts together. Of course, the number of clamps applied to a given setup is determined by the job requirements, the number of clamps appearing in FIG. 1 being merely selected for purposes of illustration.

FIG. 1 also illustrates end pieces 13 as forming part of the unit being welded. These end pieces join the top plate 11 along end seams S1 and the side plates 10 and 10a along arcuate seams S2.

In order to weld the end seams S1, for example, the welding head H would be positioned over that seam and held there while a fluid cylinder 26 slowly advances the carriage K and the entire workpiece relative to the welding head.

In order to weld arcuate seams S2 to join the end piece 13 to the plates 10 and 10a, for example, the shaft 18 that mounts the disc 15 and the fixture plate 16 would be rotated to move the seam S2 beneath the stationary welding head. The cylinder assemblies 40 would be actuated to move the welding head up into position to weld the seams S2. Thereafter the cylinder assemblies are actuated to lower the welding head into position to weld the linear bottom seam. The above procedure is repeated for the other end of the workpiece WP.

Of course, in other modes of operation both the carriage K and the welding head H could be moved simultaneously to follow the contours of irregular seams to be welded.

Clamp Structure—General Organization

FIGS. 2 and 3 illustrate the general arrangement of the clamp structure C. The actual clamping force is applied by an over-center toggle linkage actuated by the trigger T, which linkage will be described in detail after the general arrangement of the clamp structure has been explained in connection with FIGS. 2 and 3.

The over-center toggle linkage of the clamp C is mounted on the outer end of an arm 50 that overhangs the plate 11 of the workpiece WP for clamping the plate 11 against a shoulder 10b on the side plate 10 as illustrated in FIGS. 2 and 3. The arm 50 is pivotally mounted on an associated fixture side plate, such as the side plate 16 in FIGS. 2 and 3. As seen in FIG. 3, the arm 50 is formed with a bore 52 for receiving the upper end portion of a shouldered sleeve 54 with a lower, enlarged portion of the sleeve forming a seat for the under surface of the clamp arm 50. The upper end of the bore 52 is enlarged at 56 to receive the head 58 of a retaining screw 59 that is threaded into the fixture side plate 16 and pivotally mounts the arm 50 on the side plate.

A helical spring 43 is anchored at 43a to side plate 16 and at 43b to the clamp arm 50 and urges the clamp arm into its released position, shown in broken lines in FIG. 2, against a stop 44. The clamp arm is retained in its clamping position shown in solid lines in FIGS. 2 and 3 by the clamping action of the over-center toggle clamp mechanism, to be described presently.

In order to remove lost motion inherent in the pivotal mounting structure of the clamp arm just described, an abutment screw 45 is threaded at 46 into a block 17 secured to the fixture side plate 16 at each clamp. Abutment screw 45 does not prevent swinging motion of the clamp arm 50 when the clamp is released but it does prevent the clamping action of the clamp mechanism from bending the pivot screw 59 as well as taking up any lost motion in the pivotal connection between the pivot screw 59, the sleeve 54 and the clamp arm 50.

A workpiece locating button 48 is shown in FIG. 3 which button simplifies initial assembly of the workpiece side plate 10 with the side plate 16 of the fixture and hold the side plate in place as the clamps are applied. At least two of the buttons 48 will be fitted on the workpiece side plate 10 to align the workpiece with the fixture plate 16.

Toggle Clamp Structure

The toggle clamp structure of the present invention is shown in detail in FIGS. 4–7. Basically, a sliding clamp jaw 60 mounted in the arm 50 is forced into its clamping position by a toggle linkage when the latter is positioned slightly over-center in one direction. The clamp jaw is released when the toggle linkage is positioned substantially over-center in the opposite direction.

The basic elements of the clamping mechanism include the sliding clamp jaw 60, toggle linkage L and the trigger T. The toggle linkage L includes opposed clamp jaw links 62, opposed clamp arm links 64, and an operating extension 66 of the clamp arm links 64. The trigger T is pivotally mounted on the extension 66. The trigger T is moved to its clamp release position by a clamp release cam 70 when the flange 42 of the welding head engages the trigger.

The outer end of the clamp arm 50 is recessed to receive the toggle linkage. The recess has side walls 72, a rear wall 74 and a bottom wall 76. The lower end of the clamp jaw 60 is slidably mounted in a bore 78 formed in the bottom wall 76 and jaw 60 has a rounded clamping nose 80 for engaging the workpiece, such as plate 11 in the present example. Preferably, an enlarged bore 82 is formed in the bottom wall 76 for receiving a coil compression spring 84 that surrounds the clamp jaw 60. The upper end of the clamp jaw 60 is enlarged to provide a pivot head 86 having oppositely projecting trunnions 88 that are pivotally connected to the lower ends of the clamp jaw links 62.

The upper ends of the clamp jaw links 62 are pivotally mounted to the lower ends of the clamp arm links 64 by a spacing pin 90 having opposite projecting pivot trunnions 92.

The upper ends of the clamp arm links 64 and the extension 66 which is welded to those links are pivotally mounted in the side walls 72 (see FIG. 6) of the clamp arm 50 by a pivot pin 94.

As previously mentioned, the toggle linkage just described is operated by the actuation of the trigger T. The lower end of the trigger is provided with a fork 96 which straddles the extension 66 of the clamp arm links 64 and the trigger fork is pivoted to the extension 66 by a pivot pin 98.

When the flange 42 of the welding head H (FIG. 3) engages a trigger T of the clamp assembly the trigger is forced along the camming surface of a V-shaped notch 100 formed in the cam 70. The trigger T can pivot about the pin 98 when it is being forced along the cam notch 100 but this pivoting motion of the trigger does not, in and of itself, release the clamp. The clamp is released because the cam surfaces of the notch simultaneously move the trigger in a plane perpendicular to the axis of the trigger pin 98, and motion in this plane actuates the toggle linkage.

FIG. 5 illustrates the clamping mechanism of the present invention with the clamping jaw 60 in the workpiece engaging and clamping position. The trigger T is centered in the V Notch 100 of cam 70. Under these conditions, the parts are so related that the toggle linkage assembly L is slightly over-center to the right, as viewed in FIG. 5. The clamping jaw 60 is projected through the base flange 76 sufficiently for the lower end 80 of the clamping jaw to clampingly engage the workpiece plate 11. In order to determine the slightly over-center position of the linkage L in its clamping position, a set screw 102, which is adjustably mounted in the vertical flange 74 of the clamp arm 50, is engaged by the bushing 90 that carries the linkage pivot trunnions 92. The helical spring 84 assists in holding the toggle linkage in the slight over-center, clamping position illustrated in FIG. 5.

In order to release the clamp, the trigger T is engaged by the flange 42 of the welder head H as seen in FIG. 6 and the trigger is thereupon slid along one of the cam surfaces 101 of the cam notch 100. This actuation of the trigger results in trigger motion in two planes. First, there is a pivotal motion of the trigger clevis 96 about the trunnions 98 on the extension 66 of the links 64. This motion does not effect operation of the toggle linkage L but merely accommodates passage of the welding head flange 42 as it moves along the trigger.

The second motion is caused by the divergence of the associated cam faces 101 of the cam 70. This motion causes the trigger T, the extension 66 to which the clevis 96 is pivoted and the clamp arm link 64 all to pivot about the fixed pivot pin 94 that is mounted in the clamp arm flanges 72, thereby actuating the trigger.

The result of actuation of the trigger is illustrated in FIG. 7. The operative clamp surface 101 of the cam 70 pivots the trigger T to the right about the fixed pivot 94, as illustrated in broken lines in that figure. This moves the toggle linkages over-center in the opposite direction, that is, to the left as viewed in FIG. 7. When the toggle linkages move substantially over-center in the opposite direction as illustrated in FIG. 7, they lift or withdraw the clamp jaw 60 and the lower end 80 thereof clears the upper surface of the workpiece plate 11. As soon as the clamp jaw 60 clears the workpiece plate 11, the spring 43 (FIG. 3) that is connected between the fixture plate 16 and the pivoted clamp arm 50 swings the clamp arm clear of the welder from the solid line position illustrated in FIG. 2 to the broken line position illustrated in the same Figure. The same conditions of the released clamps are shown in FIG. 1. Thus, the welding head H can advance and complete its welding the seam S along portions of the unwelded seam and the workpieces that were formally covered by the clamp C.

Because of the action of the coil spring 84, once the toggle linkage reaches its over-center position in the direction illustrated in FIG. 7 the spring will urge the linkage L past the clamp release position until the pin 98 strikes a stop 98a on the rear wall 74 of the clamp arm 50. This position is represented by the solid lines in FIG. 7.

SUMMARY OF OPERATION

FIGS. 8–10A are schematic diagrams summarizing the principles of operation previously mentioned. In this set of figures, taking FIGS. 8 and 8A for example, FIG. 8 is a side elevation of the clamping mechanism and FIG. 8A is a plane view thereof, both figures illustrating the action of the flange 42 on the welder head H on the clamp trigger T and the clamp mechanism.

In FIGS. 8 and 8A, the flange 42 on the welding head is approaching the trigger T while the latter and the associated toggle link L of the clamping assembly is in the workpiece clamping position, described in detail in connection with FIG. 5. It is noted that the trigger T is at the bottom of the notch 100 formed by the cam surfaces 101 of the cam 70. The electron welding beam from the welder head H is moving toward the unwelded length of the seam S that lies beneath the clamp arm 50 but the welding head would be unable to traverse that zone so long as the clamp arm 50 is overhanging the workpiece 11 and clamping it as described.

In FIGS. 9 and 9A, the flange 42 of the welding head H has engaged the clamp trigger T and has slid it along one of the cam surfaces 101 of the cam 70. This action provides the two motions of the trigger and clamp link assembly previously mentioned. First, the trigger T can pivot about the pin 98 that mounts the clevis 96 (FIG. 6). Second, the clamp surface 101 along which the trigger is being slid by the welding head flange 42 forces the trigger T to the right, as viewed in FIGS. 9 and 9A. This motion is transmitted by the trigger clevis 96 directly to the extension 66 of the upper toggle link 64. As best seen in FIG. 7 this motion, wherein the trigger T is shown in broken lines, pivots the link 64 about the fixed pivot pin 94 and moves the toggle linkage L to the left, as viewed in FIGS. 9 and 7 to a substantially over-center position in the opposite direction. The aforesaid motion of the toggle linkage lifts the clamp jaw 60 clear of the workpiece plate 11, as described.

Referring to FIGS. 10 and 10A, as soon as the clamp jaw 60 is lifted clear of the workpiece 11, as described in connection with FIGS. 9 and 9A, the clamp arm 50 is free to pivot clear of the advancing flange 42 of the welding head H. This pivoting motion of the clamp arm 50 is provided by the action of the helical torsion spring 43 (FIGS. 2 and 3). In FIGS. 10 and 10A the clamp arm 50 is shown partially pivoted or swung clear of the seam S being welded by the welding head H. As previously described the helical torsion spring 43 continues its swinging action on the clamp arm 50 until that arm engages the stop 44 as shown in broken lines in FIG. 2.

Thus, as the welding head H advances toward a clamped position of the workpiece, the clamps are automatically released and swing clear of the welding head so the welding head can continue to weld along the seam S without interference by the clamps.

After completion of a welding operation on the workpiece, the fixture fluid cylinder 20 (FIG. 1) is actuated to release the workpiece and a new workpiece is inserted into and clamped by the fixture. The clamps C are then individually and manually swung around about their pivots (FIG. 3) until they overhang the plates to be clamped. The trigger T is manually positioned to the base of the notch 100 formed by the cam faces 101 of the cam 70. This returns the clamp structure to the condition illustrated in FIG. 5 and holds the clamp in its workpiece over-hanging position, best seen in solid lines in FIG. 2. A new welding operation on a new workpiece can now be performed without interference by the clamps, because the clamps are self-clearing in accordance with the principles of the present invention.

Having completed a detailed description of the preferred embodiment of the invention so that it may be understood by those skilled in the art, I claim:

1. A workpiece fixture having a workpiece clamp for holding the workpiece on the fixture during relative motion of the fixture and a tool along a path having a central axis, said clamp comprising an elongated mounting member, means disposed normal to said elongated mounting member for swingably mounting said elongated mounting member on the fixture for movement between a released position entirely on one side of said central axis of said path and a clamping position having an outer portion of said mounting member extending across said central axis of said path, a clamping jaw movably mounted on said outer portion of said mounting member, clamping jaw clamping and release means including a trigger on said mounting member, said trigger projecting into the path of said tool when in said clamping position, and means connected between the fixture and said mounting member for swinging said clamping jaw and said elongated mounting member relative to said fixture to said released position clear of said path of relative fixture and tool motion upon release of said clamping jaw when the tool actuates the trigger.

2. A workpiece fixture having a workpiece clamp for clamping a workpiece having a flat surface on the fixture during relative motion of the fixture and a tool along a path, said clamp comprising an arm on the fixture for overhanging a portion of the workpiece, means for swingably mounting said arm on the fixture for swinging in a plane parallel to a flat surface of the workpiece, a clamping jaw actuating means on said arm, a trigger pivotally mounted on said clamp arm for operating said actuating means, said trigger projecting into the path of said relative tool and fixture motion for engagement by said tool, said trigger being pivotally displaceable by said tool for releasing said clamp jaw, and means connected between the fixture and the clamp arm for automatically swinging said clamp arm relative to said fixture and clear of said path of relative motion in a plane parallel to said flat surface in response to release of said clamping jaw when the tool actuates the trigger.

3. Workpiece mounting and clamping apparatus for a relatively moving workpiece and welder; said apparatus comprising a fixture for supporting workpieces to be seam welded, a quick release workpiece clamp, means for movably mounting said clamp on said fixture on one side of the seam to be welded, said clamp having pivotal clamp releasing trigger means disposed on the other side of the seam to be welded and in the path of the welder, means for pivotally releasing said clamp in response to trigger means actuation, means associated with the welder for actuating said trigger means, and means connected between the fixture and the clamp for automatically moving the clamp on said fixture clear of the welding path in response to release of said clamp and from said other side of the seam to said one side.

4. A self-clearing mechanical clamp for clamping a workpiece in a work position relative to a work holding fixture, said clamp comprising a clamping assembly having a trigger member, a clamping jaw which is movable between a clamping position on a flat surface of the workpiece and a released position, and linkage connecting said trigger member to said clamping jaw for moving said clamping jaw between said clamping and release positions, said linkage being held in said clamping position by force between said clamping jaw and the workpiece and being moved to said release position in response to movement of said trigger to a clamp releasing position, an arm for mounting said clamping assembly, a pin pivotally mounting said arm on the fixture, and a spring disposed to move said arm and clamp assembly about said pin in a plane substantially parallel to said flat surface to a position that is clear of the workpiece when said trigger moves said linkage to said release position.

5. A self-clearing clamp assembly for clamping a workpiece in a work position relative to a work holding fixture for operation on the workpiece by a relatively moving tool, said clamp assembly comprising an arm, means for pivotally mounting the arm on the fixture, a clamp jaw movably mounted on said arm for clamping a flat portion of said workpiece, an over-center toggle linkage, said linkage having an intermediate toggle pivot for connecting the toggle links, a clamp jaw pivot for connecting one toggle link to said clamp jaw and a mounting pivot for connecting the other toggle link to said arm, a trigger connected to said other toggle link and projecting into the path of a tool that performs an operation of the workpiece, said trigger having a workpiece clamping position wherein said toggle linkage is slightly over-center in one direction for closing said clamp jaw and a workpiece release position wherein said toggle linkage is substantially over-center in the other direction for releasing said clamp jaw, actuation of the trigger by the tool being effective to release said clamp jaw, release of said clamp jaw being effective to swing said arm and said clamp assembly in a plane parallel to said flat portion of the workpiece to a position clear of the tool.

6. The clamp assembly of claim 5; and additionally comprising spring means for swinging said arm in response to releasing said clamp jaw.

7. A self-clearing clamp assembly for clamping a workpiece in a work position relative to a work holding fixture for operation of the workpiece by a relatively moving tool, said clamp assembly comprising an arm, means for pivotally mounting the arm on the fixture, a clamp jaw movably mounted on said arm, an over-center pivoted toggle linkage connected between said clamp jaw and said arm, said toggle linkage having a workpiece clamping position wherein said toggle linkage is slightly over-center in one direction for closing said clamp jaw and a workpiece release position wherein said toggle linkage is substantially over-center in the other direction for releasing said clamp jaw, a trigger connected to said toggle linkage, said trigger projecting into the path of the tool as the tool moves relative to the workpiece, actuation of the trigger by the tool when said toggle linkage is slightly over-center releasing said clamp jaw, release of said clamp jaw accommodating swinging of said arm to a position clear of the tool, said connection of the trigger to the toggle linkage comprising means for pivotally connecting the trigger to the toggle linkage for pivotal movement of the trigger relative to the toggle linkage, said pivotal motion of the trigger relative to the toggle linkage being about an axis that is normal to the pivot axis of the toggle linkage.

8. A self-clearing welding clamp assembly for clamping one workpiece in a position relative to another workpiece mounted on a work holding fixture for welding a seam that joins the workpieces by a relatively moving welding head; said clamp assembly comprising an arm, means for pivotally mounting the arm on the fixture, a clamp jaw movably mounted on said arm, an over-center toggle linkage connected between said clamp jaw and said arm, said toggle linkage being pivotally movable in a plane relative to the welding seam, said toggle linkage being pivotable to a workpiece clamping position wherein said toggle linkage is slightly over-center in one direction for closing said clamp jaw, said toggle linkage being pivotable to a workpiece release position wherein said toggle linkage is substantially over-center in the other direction for releasing said clamp jaw, spring means between said arm and said toggle linkage for resiliently urging said toggle linkage toward whichever over-center position it has assumed, a trigger connected to said toggle linkage for pivotal motion relative to the pivotal motion of said linkage but solely in a plane that is normal to the plane of pivotal motion of said toggle linkage, said trigger projecting into the path of the tool as the tool moves relative to the workpiece, cam means on said arm and engaging said trigger for converting motion of said trigger in a direction normal to the plane of motion of said toggle linkage into motion of the trigger and of said toggle linkage in the plane of motion of said toggle linkage, actuation of the trigger by the tool when said toggle linkage is slightly over-center releasing said clamp jaw, release of said clamp jaw accommodating swinging of said arm to a position clear of the tool.

9. A self-clearing welding clamp assembly for clamping one workpiece in a position relative to another workpiece mounted on a work holding fixture for welding a seam that joins the workpieces by a relatively moving welding head; said clamp assembly comprising an arm, means for pivotally mounting the arm on the fixture, a clamp jaw movably mounted on said arm, an over-center toggle linkage connected between said clamp jaw and said arm, said toggle linkage being pivotally movable in a direction that is substantially normal to the welding seam, said toggle linkage being pivotable to a workpiece clamping position wherein said toggle linkage is slightly over-center in one direction for closing said clamp jaw, said toggle linkage being pivotable to a workpiece release position wherein said toggle linkage is substantially over-center in the other direction for releasing said clamp jaw, spring means between said arm and said toggle linkage for resiliently urging said toggle linkage toward whichever over-center position it has assumed, a trigger connected to said toggle linkage for pivotal motion relative to the pivotal motion of said linkage but solely in a plane that is substantially parallel to the welding seam, said trigger projecting into the path of the tool as the tool moves relative to the workpiece, cam means on said arm and engaging said trigger for converting motion of said trigger in a direction parallel to the welding seam into motion of the trigger and of said toggle linkage in a direction normal to the seam, actuation of the trigger by the tool when said toggle linkage is slightly over-center releasing said clamp jaw, release of said clamp jaw accommodating swinging of said arm to a position clear of the tool.

10. The welding clamp assembly of claim 9; wherein said cam means is configured for performing said connecting motion of the trigger by motion of the trigger in either direction parallel to the welding seam.

11. The welding clamp assembly of claim 10; wherein said cam means has a generally concave surface for engaging said trigger, said toggle spring means urging said trigger to the bottom portion of said concave surface.

12. The welding clamp of claim 11; wherein said concave cam means surfaces is in the form of a shallow, generally V-shaped notch.

* * * * *